Figure 1:
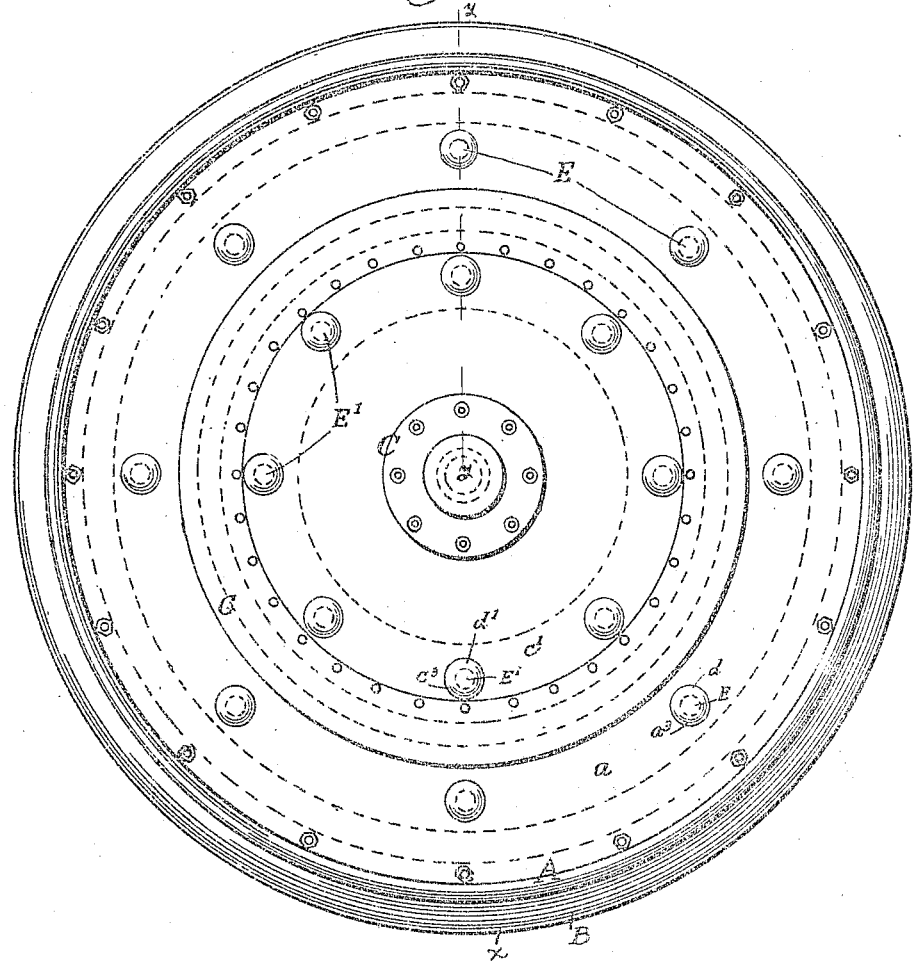

W. W. CHEESEMAN.
AUTOMOBILE WHEEL.
APPLICATION FILED FEB. 29, 1912.

1,055,709.

Patented Mar. 11, 1913.
3 SHEETS—SHEET 1.

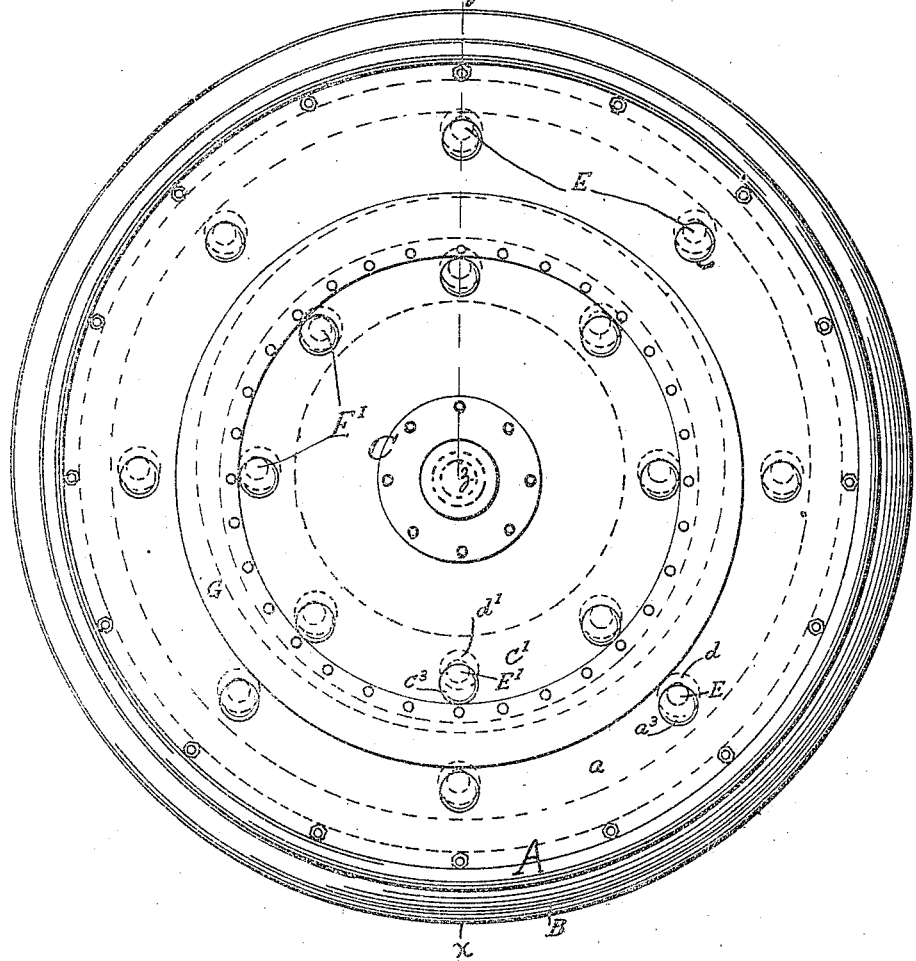

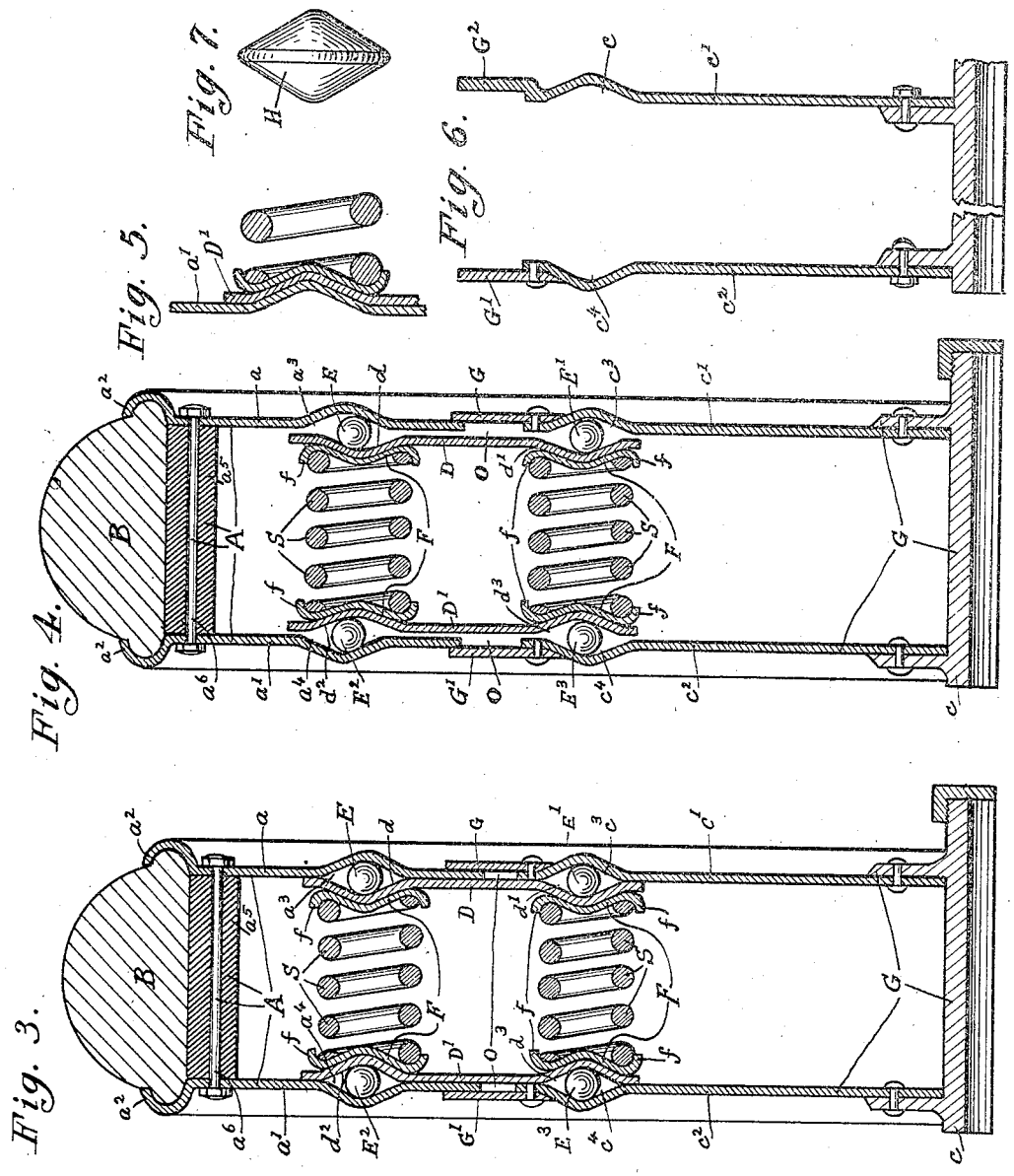

UNITED STATES PATENT OFFICE.

WILLIAM W. CHEESEMAN, OF CINCINNATI, OHIO.

AUTOMOBILE-WHEEL.

1,055,709.   Specification of Letters Patent.   Patented Mar. 11, 1913.

Application filed February 29, 1912. Serial No. 680,620.

*To all whom it may concern:*

Be it known that I, WILLIAM W. CHEESEMAN, a citizen of the United States, residing at Cincinnati, in the county of Hamilton and State of Ohio, have invented new and useful Improvements in Automobile-Wheels, of which the following is a specification.

My invention relates to wheels, particularly for motor vehicles, and provides means tending to dissipate the shock received from the uneven surface traveled over; for the double purpose of protection of the vehicle itself and the load in it.

This improved wheel consists of a hollow outer circular rim member carrying the tire; hollow inner circular hub member, whose periphery is less than the opening of the outer member; two inside circular plates overlapping the contiguous portions of the rim and hub members; overlapping surfaces separated by suitably seated balls or other wedging members, and springs to hold the inside plates securely in position. Every ball is seated in a double conical recess to permit equally free movement in any direction of parts contiguous to it; so that the strain from the impact of the tire with the surface traveled is distributed equally throughout the wheel. The rim member, displaced diametrically from its normal position by the force of an impact, is driven on the side of the blow toward the hub member, and away from it on the opposite side. Each of the balls rolling between the opposed recess surfaces of the wheel members proper on the outside and those of the loose plates on the inside cause the two plates to be pressed inwardly toward each other. This compresses the springs, and the force of the shock is dissipated in the wheel itself and never transmitted to the rest of the vehicle. The desirability of attaining this end has long been realized and various means provided for doing it; but my invention provides an inexpensive, simple mechanism adapted to perfectly operate under all conditions, not likely to get out of repair, and readily taken apart for inspection or repairs when necessary.

My invention is illustrated in the accompanying drawings, in which,—

Figure 1, is a side elevation of a wheel bearing my improvements with parts covered dotted in; all parts in normal position; Fig. 2 is the same when parts have changed position because of impact with some object at $x$. Fig. 3 is a radial section of the wheel along the line $y$—$y$ in Fig. 1. Fig. 4 is a radial section of the wheel along the line $z$—$z$ in Fig. 2. Fig. 5 is an alternative construction in which the projections on the outer plates take the place of the balls and fit into the recesses on the inner plates. Fig. 6 is a detail of the hub member in alternative form with removable side plates. Fig. 7 a detail, is a circular wedge both of whose sides are conical. Such wedges may be used in place of the balls.

Referring now to the drawings, A is a shell composing the whole rim member of the wheel, whose sides are formed of two similar rings, $a$, on the outer side of the wheel, and $a^1$ on the inner side. These sides $a$ and $a^1$, are cupped at their peripheral edges $a^2$, to hold the tire B; and at any suitable number of points preferably equidistant from each other, have outwardly extending conical projections with rounded apex. These projections form on the inner surfaces of the sides, recesses, designated as $a^3$ on $a$, and as $a^4$ on $a^1$. These recesses are at such points on the sides, $a$ and $a^1$, as to be exactly opposite each other when the wheel is assembled. The sides $a$, $a^1$, preferably extend inward radially far enough beyond the recesses to be safely overlapped in all positions by a ring designated as G on the outer side of the wheel and $G^1$ on the inner side; said rings will hereafter be described. The sides $a$, $a^1$, are kept properly spaced by a ring $a^5$, and both of the sides and the ring are pierced at suitable points and firmly bound together by bolts $a^6$.

The whole hub member is designated as C and consists of the hub proper $c$, to which is secured a ring plate $c^1$ on the outer side of the wheel, and a similar ring plate $c^2$ on the inner side, with recesses similar to those described in the sides $a$, $a^1$. One or both of the plates $c^1$, $c^2$, may be readily detachable and secured to the hub by screws or bolts for convenience in inserting springs, etc. (See Fig. 6.) The recesses in the plate $c^1$ are designated as $c^3$, and those in the plate $c^2$ as $c^4$. The plates $c^1$, $c^2$, extend preferably beyond the projections that form these recesses, and such extended surface is preferably flush with the contiguous surface of the sides $a$, $a^1$, respectively, but on each side the periphery of the hub member falls short of the inner circumference of the rim member, so as to leave a suitable space O, to allow for movement of the parts. A ring plate G may be fixed to the outer edge of the plate $c^1$ so as to keep dust and dirt out of the space O, and a like plate $G^1$ to $c^2$.

Ring plates G, $G^1$, if close fitting will make the whole interior of the wheel a reservoir suitable for holding sufficient oil to keep all its working parts well lubricated.

Fig. 6 shows on one side the hub flange bent outwardly and extended to form the ring that closes the space O. This extension is designated as $G^2$, and performs the same function as G and $G^1$.

A ring plate D adapted to fit closely against the inside of the plates $a$ and $c^1$ preferably extends outwardly somewhat beyond the recess $a^3$, and inwardly somewhat beyond the recesses $c^3$; and has recesses $d$ similar to those designated as $a^3$, adapted to correspond to recesses $a^3$. Each recess $a^3$ and its corresponding recess $d$ holds a ball E of hardened steel or the like. The plate D also has similar recesses $d^1$ at points corresponding to the recesses $c^3$ on the hub member. Each recess $d^1$ and its corresponding recess $c^3$ holds a similar ball $E^1$. A similar ring plate $D^1$ adapted to fit closely against the inside of the plates $a^1$ and $c^2$, has recesses $d^2$ corresponding to recesses $a^4$ each pair of recesses holding a ball $E^2$; and recesses $d^3$ corresponding to recesses $c^4$ each pair of these recesses holding a ball $E^3$. Each of the projections formed by the recesses $d$, $d^1$, $d^2$ and $d^3$ is provided with a cupped plate F, having a peripheral flange $f$ adapted to hold a suitable coiled spring S. It will be borne in mind that each of the balls E and attendant incasement is opposite a ball $E^2$ and its incasement, and that this is also true of the balls $E^1$ and $E^3$. There are preferably as many springs holding the plates D, $D^1$, against the sides of the hub member as there are against the sides of the rim member; and preferably all springs are of the same strength.

In the alternative form, the sides of the hub and rim members and the inner plates or at least the recessed and projecting portions thereof are of hardened steel; the projections of the outer plates $a$ and $c^1$ fit into the recesses of the plate D, and the projections of the outer plates $a^1$ and $c^2$ fit into the recesses of the plate $D^1$, taking the place of and performing the function of the balls.

Circular conical sided wedges H may be used instead of the balls, E, $E^1$, $E^2$ and $E^3$.

The operation of the wheel is as follows: If a hard jolt originates at $x$, the rim member A is relatively displaced, causing its inner circumference on that radius to approach more closely to the periphery of the hub member C on the same radius, and the corresponding space on the opposite radius to correspondingly widen. This change of position of the rim member A causes the conical side $a^3$ to tend to approach toward the conical side $d$ in each recess cavity in the line of the force exerted; but these sides are definitely spaced by the balls E. There is a similar tendency and condition on the inner side of the wheel. But the walls $a$, $a^1$, are rigid, while the plates D, $D^1$, are only held by the tension of the springs S, so that each ball acts as a wedge between the opposite conical sides of its recess, and the plates D and $D^1$ are forced toward each other.

The rim member A, the hub member C, the plate D and the plate $D^1$ are each a rigid unit, so the amount of relative movement of each of the balls and their recess walls is the same; all springs are depressed alike and the shock is equally distributed throughout the wheel, and in this cross motion dissipated.

I claim as my invention and desire to secure by Letters Patent of the United States:—

1. A vehicle wheel comprising a hub member with flanges extending outward radially forming part of the wheel sides; a rim member with flanges extending inward radially forming part of the wheel sides terminating short of the hub flanges but in the same planes as the flanges of the hub member; two loose ring plates within the wheel, one on either side overlapping both the hub and rim flanges; a plurality of springs normally holding each ring plate against its adjacent wheel side; and means for forcing the ring plates toward each other by the diametrical displacement of the rim.

2. A vehicle wheel, having in combination a hub member with flanges forming part of the wheel sides; a rim member with flanges extended inward radially forming part of the wheel sides, terminating short of the hub flanges but in the same planes as the flanges of the hub member; two loose ring plates within the wheel, one on either side overlapping both the hub and rim flanges; a plurality of seats for wedging members formed partly in each rim flange and partly in the contiguous portion of its ring plate; a plurality of seats for wedging members formed partly in each flange of the hub member and partly in the contiguous portion of its ring plate; wedging members in each of said seats; and resilient means for forcing each ring plate outward against its adjacent wheel side.

3. A vehicle wheel, having in combination a hub member with flanges extending outward radially forming part of the wheel sides; a rim member with flanges extended inward radially forming part of the wheel sides but terminating short of the hub flanges; two loose ring plates within the wheel, one on either side thereof, each overlapping both the hub and rim flanges; on each side of the wheel a plurality of receptacles for wedging members, each receptacle being formed of a conical sided depression in the rim flange and a similar one in a contiguous part of the ring plate; a plurality of similar receptacles in each hub flange and contiguous portion of its ring plate; a wedging member in each receptacle; and resilient means for pressing each ring plate outward toward its adjacent wheel side.

4. A hollow vehicle wheel having in combination a hub member with flanges extending outward radially forming part of the wheel sides; a rim member with flanges extending inward radially forming part of the wheel sides but terminating short of the hub flanges; two loose ring plates within the wheel, one on either side thereof, each overlapping both the hub and rim flanges; a plurality of oppositely disposed receptacles for wedging members, each receptacle formed partly by an outwardly projecting depression in the rim flange, and partly by an outwardly projecting depression in the adjacent portion of the loose ring; a wedging member in each receptacle; other oppositely disposed receptacles, each formed partly by a similar depression in the hub flange, and partly by a depression in the adjacent portion of the loose ring; a wedging member in each such receptacle; and springs between said ring plates tending to force each outward against its adjacent wheel side.

5. A vehicle wheel, comprising a hub member with flanges extending outward radially forming part of the wheel sides; a rim member with flanges extending inward radially forming part of the wheel sides but terminating short of the hub flanges; two loose ring plates within the wheel, one on either side thereof, each overlapping both the hub and rim flanges; a plurality of receptacles for balls on each side of the wheel, each receptacle formed partly by a depression in the rim flange, and partly by a depression in the adjacent portion of the loose ring; a ball in each receptacle; other receptacles, on each side of the wheel, each formed partly by a depression in the hub flange, and partly by a depression in the adjacent portion of the loose ring; a ball in each such receptacle; and springs between said ring plates tending to hold each against its adjacent wheel side.

6. A vehicle wheel, comprising a hub member with flanges extending outwardly radially forming part of the wheel sides; a rim member with flanges extending inward radially forming part of the wheel sides but terminating short of the hub flanges; two loose ring plates within the wheel, one on either side thereof, each overlapping both the hub and rim flanges; a plurality of oppositely disposed receptacles for wedging members, each receptacle being conical sided and formed partly in the rim flange and partly in the adjacent portion of the loose ring; a wedging member in each receptacle; other oppositely disposed receptacles, each receptacle being conical sided and formed partly by a depression in the hub flange, and partly by a depression in the adjacent portion of the loose ring; a wedging member in each such receptacle; and springs between said ring plates tending to hold each against its adjacent wheel side.

7. A vehicle wheel, comprising a hub member with flanges extending outward radially forming part of the wheel sides; a rim member with flanges extending inward radially forming part of the wheel sides but terminating short of the hub flanges; two loose ring plates within the wheel, one on either side thereof, each overlapping both the hub and rim flanges; a plurality of oppositely disposed receptacles for balls, each receptacle being conical sided and formed partly in the rim flange and partly in the adjacent portion of the loose ring; a ball in each receptacle; other oppositely disposed receptacles, each receptacle being conical sided and formed partly by a depression in the hub flange and partly by a depression in the adjacent portion of the loose ring; a ball in each such receptacle; and springs between said ring plates tending to hold each against its adjacent wheel side.

8. A vehicle wheel, comprising a hub member with flanges extending outward radially forming part of the wheel sides; a rim member with flanges extending inward radially forming part of the wheel sides but terminating short of the hub flanges; two loose ring plates within the wheel, one on either side thereof, each overlapping both the hub and rim flanges; a plurality of oppositely disposed receptacles for wedging members; each receptacle being formed partly by a conical sided depression in the rim flange, and partly by a conical sided depression in the adjacent portion of the loose ring; a wedging member in each receptacle; other oppositely disposed receptacles, each formed partly by a conical sided depression in the hub flange, and partly by a conical sided depression in the adjacent portion of the loose ring; a wedging member in each such receptacle; and a spring seated over each oppositely disposed pair of receptacles and tending to hold each ring plate against its adjacent wheel side.

9. A vehicle wheel, comprising a hub member with flanges extending outward radially forming part of the wheel sides; a rim member with flanges extending inward radially forming part of the wheel sides but terminating short of the hub flanges; two loose ring plates within the wheel, one on either side thereof, each overlapping both the hub and rim flanges; a plurality of oppositely disposed receptacles for balls, each receptacle being formed partly by a conical sided depression in the rim flange, and partly by a conical sided depression in the adjacent portion of the loose ring; a ball in each receptacle; other oppositely disposed receptacles, each formed partly by a conical sided depression in the hub flange, and partly by a conical sided depression in the adjacent portion of the loose ring; a ball in each such receptacle; and a spring seated over each oppositely disposed pair of receptacles and tending to hold each ring plate against its adjacent wheel side.

10. A hollow vehicle wheel, comprising a hub member with flanges extending outwardly radially forming part of the wheel sides; a rim member with flanges extending inward radially forming part of the wheel sides but terminating short of the hub flanges; two loose ring plates within the wheel, one on either side thereof, each overlapping both the hub and rim flanges; a plurality of oppositely disposed receptacles for wedging members, each receptacle being formed partly by a conical sided depression in the rim flange, and partly by a conical sided depression in the adjacent portion of the loose ring; a wedging member in each receptacle; other oppositely disposed receptacles, each formed partly by a conical sided depression in the hub flange, and partly by a conical sided depression in the adjacent portion of the loose ring; a wedging member in each such receptacle; a spring seated over each oppositely disposed pair of receptacles and tending to hold each ring plate against its adjacent wheel-side; and a guard over the space between the flange of the hub member and the flange of the rim member.

11. A hollow vehicle wheel, comprising a hub member with flanges extending outward radially forming part of the wheel sides; a rim member with flanges extending inward radially forming part of the wheel sides but terminating short of the hub flanges; two loose ring plates within the wheel, one on either side thereof, each overlapping both the hub and rim flanges; a plurality of oppositely disposed receptacles for balls, each receptacle being formed partly by a conical sided depression in the rim flange, and partly by a conical sided depression in the adjacent portion of the loose ring; a ball in each receptacle; other oppositely disposed receptacles, each formed partly by a conical sided depression in the hub flange, and partly by a conical sided depression in the adjacent portion of the loose ring; a ball in each such receptacle; a spring seated over each oppositely disposed pair of receptacles, and tending to hold each against its adjacent wheel side; and rings attached to the outsides of the flanges of the hub member to keep the opening closed between the hub flange and the rim flange.

12. A wheel comprising a hollow rim member, a hollow hub member, a loose ring within the wheel overlapping both outer rim side and outer wheel side; a loose ring within the wheel overlapping both inner rim side and inner hub side; a plurality of oppositely disposed, inwardly projecting conical sided depressions in each ring plate toward its periphery; similar corresponding outwardly projecting depressions in the contiguous portions of each rim side, a wedging member in each such recess, similar depressions in each ring plate toward its inner edge; similar depressions in the corresponding portions of each hub side, a wedging member for each such recess, a hollowed and cupped spring seat over each ring plate projection, a compressed coiled spring seated upon each inner spring seat and extending to and seating upon the opposite outer spring seat, and an outer guard over each of the spaces between the rim side and the hub side.

In testimony whereof I have hereunto set my hand in presence of two subscribing witnesses.

WILLIAM W. CHEESEMAN.

Witnesses:
WALTER A. KNIGHT,
ALICE L. TILDESLEY.